(12) United States Patent
Lee (10) Patent No.: US 12,104,220 B2
(45) Date of Patent: Oct. 1, 2024

(54) WELDING BASE METAL FOR RECYCLING RAILWAY WHEEL AND METHOD FOR RECYCLING RAILWAY WHEEL USING THE SAME

(71) Applicant: ASIATECH CO., LTD., Jecheon-si (KR)

(72) Inventor: Young Jin Lee, Jecheon-si (KR)

(73) Assignee: ASIATECH CO., LTD., Jecheon-si (KR)

( * ) Notice: Subject to any disclaimer, the term of this patent is extended or adjusted under 35 U.S.C. 154(b) by 0 days.

(21) Appl. No.: 18/120,222

(22) Filed: Mar. 10, 2023

(65) Prior Publication Data

US 2023/0272501 A1    Aug. 31, 2023

Related U.S. Application Data

(62) Division of application No. 16/881,315, filed on May 22, 2020, now abandoned.

(30) Foreign Application Priority Data

Nov. 26, 2019   (KR) .................. 10-2019-0152960

(51) Int. Cl.
C21D 9/50        (2006.01)
B60B 17/00       (2006.01)
(Continued)

(52) U.S. Cl.
CPC ............ *C21D 9/50* (2013.01); *B60B 17/0006* (2013.01); *C21D 6/004* (2013.01); *C21D 6/005* (2013.01);
(Continued)

(58) Field of Classification Search
None
See application file for complete search history.

(56) References Cited

U.S. PATENT DOCUMENTS

2003/0116549 A1    6/2003  Vanstone et al.
2008/0142490 A1*   6/2008  Suzuki ............... B23K 35/0261
                                                            219/74
2019/0100822 A1    4/2019  Lehnhoff et al.

FOREIGN PATENT DOCUMENTS

CN         1709636 A        12/2005
DE          261699 A3       11/1988
JP       S52152844 A        12/1977
(Continued)

OTHER PUBLICATIONS

International Search Report and Written Opinion of the International Searching Authority for International Application No. PCT/KR2020/005665 date of mailing Aug. 7, 2020.

*Primary Examiner* — Jenny R Wu
(74) *Attorney, Agent, or Firm* — Rimon PC; Marc S. Kaufman (57) ABSTRACT

The present disclosure relates to a welding base metal for recycling a railway wheel and a method for recycling a railway wheel using the same, which can overlay-weld a railway wheel with a welding base metal suitable for overlay-welding a railway wheel through a heat treatment, form a surface hardened layer, and strengthen the metal structure of the railway wheel, in order to recycle the railway wheel. The welding base metal for recycling a railway wheel may be used as a surface hardened layer of a railway wheel because the welding base metal has high hardness while exhibiting a similar property to the railway wheel. Furthermore, the welding base metal can change the metal structure of the recycled railway wheel, and thus delay the initial wear time of the recycled railway wheel. The method for recycling a railway wheel may overlay-weld the damaged railway wheel to its original size, form a surface hardened layer, and change the metal structure of the railway wheel by changing the composition of the welding base metal and (Continued)

performing the pre-heat treatment and the post heat treatment, thereby minimizing the occurrence of damage to the recycled railway wheel.

6 Claims, 5 Drawing Sheets

(51) Int. Cl.
  *C21D 6/00* (2006.01)
  *C22C 38/02* (2006.01)
  *C22C 38/44* (2006.01)
  *C22C 38/46* (2006.01)
  *C22C 38/48* (2006.01)
  *C22C 38/50* (2006.01)
  *C22C 38/58* (2006.01)
(52) U.S. Cl.
  CPC .............. *C22C 38/02* (2013.01); *C22C 38/44* (2013.01); *C22C 38/46* (2013.01); *C22C 38/48* (2013.01); *C22C 38/50* (2013.01); *C22C 38/58* (2013.01)

(56) References Cited

FOREIGN PATENT DOCUMENTS

| | | | |
|---|---|---|---|
| JP | H02179389 A | | 7/1990 |
| JP | H05084569 A | | 4/1993 |
| JP | H0825080 A | * | 1/1996 |
| JP | H0966389 A | | 3/1997 |
| JP | H09076091 A | | 3/1997 |
| JP | 2006266154 A | | 10/2006 |
| JP | 2007289965 A | * | 11/2007 |
| JP | 2009226476 A | | 10/2009 |
| JP | 2018059190 A | | 4/2018 |
| JP | 2018187640 A | | 11/2018 |
| JP | H08276293 A | | 10/2022 |
| KR | 930009964 B1 | | 10/1993 |
| KR | 101501284 B1 | * | 3/2015 ........... B23K 35/308 |

* cited by examiner

WELDING BASE METAL FOR RECYCLING RAILWAY WHEEL AND METHOD FOR RECYCLING RAILWAY WHEEL USING THE SAME

RELATED APPLICATIONS

This application claims the benefit of priority from U.S. patent application Ser. No. 16/881,315 filed May 22, 2020, and South Korean Patent Application No. 10-2019-0152960 filed Nov. 26, 2019, the disclosures of which are incorporated herein by reference in their entirety.

BACKGROUND

1. Technical Field

The present disclosure relates to a welding base metal for recycling a railway wheel and a method for recycling a railway wheel using the same, and more particularly, to a welding base metal for recycling a railway wheel and a method for recycling a railway wheel using the same, which can overlay-weld a railway wheel with a welding base metal suitable for overlay-welding a railway wheel through a heat treatment, form a surface hardened layer, and strengthen the metal structure of the railway wheel, in order to recycle the railway wheel.

2. Related Art

Figure 1:
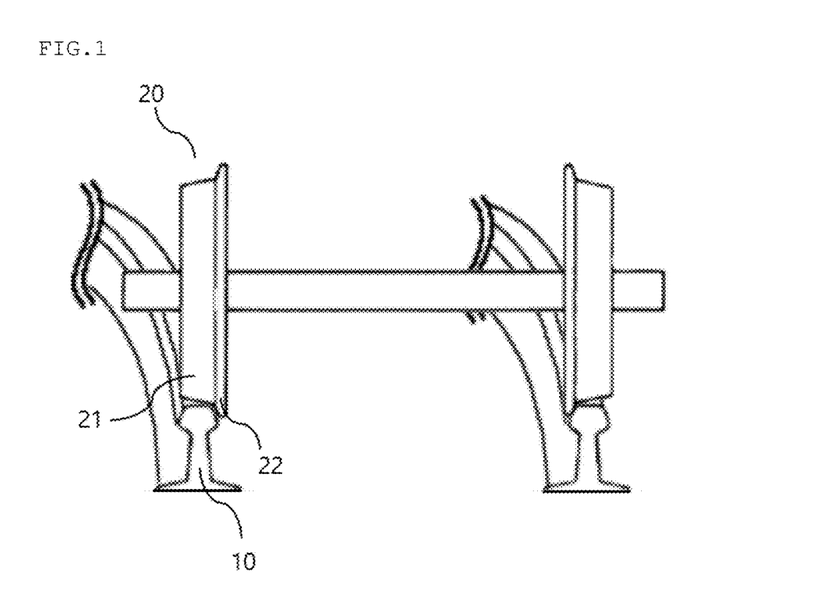
FIG. 1 is a diagram illustrating the shape of a general railway wheel disposed on the rail.

In general, a train includes a group of railway cars to run on the rail. For this operation, the railway car has railway wheels formed in a specific shape. FIG. 1 illustrates the shape of the railway wheels of such a railway car.

Referring to FIG. 1, a railway wheel 20 of a train includes a tire part 21 which comes in contact with the top of a rail 10 when the train moves and a flange part 22 which serves to prevent a separation of the railway wheel inside the rail 10.

Figure 2:
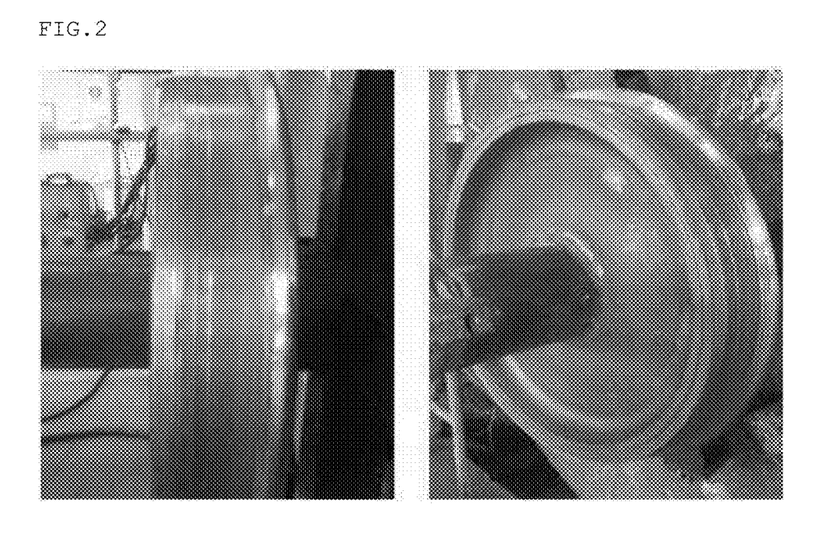
FIG. 2 is a photograph showing a worn railway wheel.

As shown in FIG. 2, such a railway wheel is worn by friction with the rail when the train runs or stops on the rail. At this time, a plurality of railway wheels included in one group of railway cars may have different wear levels depending on the state of the rail or the operation characteristics of the train, and one-sided wear may occur in each of the railway wheels when the railway wheel is worn out from just one side. FIG. 2 is a photograph showing a worn railway wheel. When one-sided wear occurs in the railway wheel as shown in FIG. 2, the one-sided wear not only has a bad influence on a ride quality, but also causes various safety problems.

When stress between the railway wheel and the rail increases, plastic deformation in surfaces of the railway wheel and the rail may be increased to damage the base material. Such a phenomenon is referred to as spalling. Spalling occurs on the surface of the railway wheel, and mainly results from high friction. When spalling occurs, a crack starts in a radial direction at a low angle from the surface of the railway wheel, extends in a circumferential direction from the radial direction, and then extends toward the surface again, with broken pieces separated from the surface. Furthermore, while the railway wheel locally slips on the rail, a flat portion is locally formed on the contact portion with the rail.

Since this portion is rapidly cooled at high temperature, a state change occurs to form a martensite region. This region is so brittle that a crack easily propagates. Thus, spalling occurs on the railway wheel.

While the train travels, the rail and the railway wheel come in rolling contact with each other. When the number of time that the rail comes in rolling contact increases, the surface metal of the railway wheel coming in contact with the rail is fatigued. Furthermore, when the railway wheel is spun or slid while the train is driven or stopped, the surface layer of the railway wheel is thermally transformed into a hard and brittle metal structure by frictional heat. With the metal fatigue and the white layer as the starting point, a crack may occur. When the railway wheel is continuously operated with the crack left alone, a notch or detachment may occur on the surface of the railway wheel and thus break the rail. Such damage is collectively referred to as shelling. Shelling causes noise or damages the railway wheel while an impact load is applied due to the notch of the surface of the railway wheel during the operation of the train.

Therefore, for a train which has been operated for a predetermined period, the wear, spalling and shelling levels of railway wheels thereof need to be measured. When the wear, spalling and shelling levels of a certain railway wheel exceed predetermined levels, the railway wheel needs to be replaced. In the related art, in order to solve a problem such as the cost due to the replacement of railway wheels, railway wheels where one-sided wear, spalling and shelling have progressed are checked, and a railway wheel having no internal cracks is recycled and reused through repair and processing.

In the related art, an internal crack detection device and a railway wheel recycling device having the same are used to recycle a damaged railway wheel through cutting work. In such a railway wheel recycling method through the cutting work, however, the worn railway wheel is cut and reused in order to recycle the railway wheel. When the size of the railway wheel is reduced to a predetermined size or less, the railway wheel is discarded. Thus, the lifetime of the railway wheel is inevitably reduced.

Therefore, instead of the method for recycling a railway wheel through cutting work, a method has been used, which recycles a railway wheel by overlay-welding the railway wheel using a welding base metal suitable for overlaying the railway wheel, and forming a surface hardened layer. Even in such a railway wheel recycling method through overlay welding, however, wear, spalling or shelling continuously occurs in the recycled railway wheel as in a railway wheel which is not yet recycled, due to the characteristics of the steel structure.

Such wear, spalling or shelling is significantly affected by the steel structure and mechanical properties of railway wheels. In particular, with the recent increase in speed and weight of railway cars, the occurrence of damage to the railway wheels, such as wear, spalling or shelling, is increasing. Thus, the operation stability is degraded, the maintenance cost is increased, and the ride quality is degraded by noise and vibration.

Figure 3A:
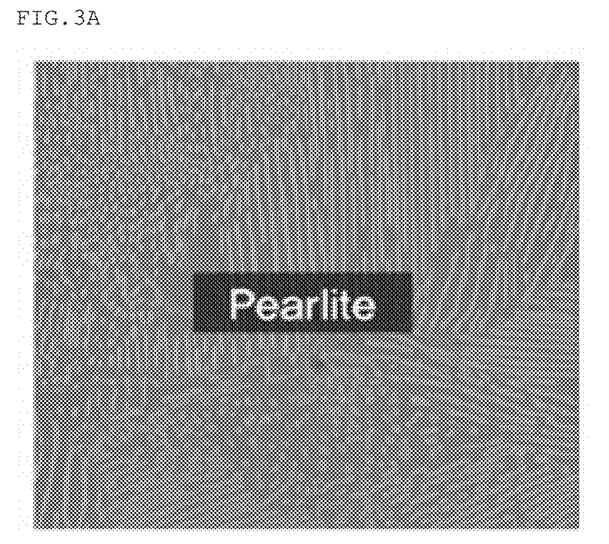
FIGS. 3A and 3B are photographs comparatively showing metal structures of railway wheels.
Figure 3B:
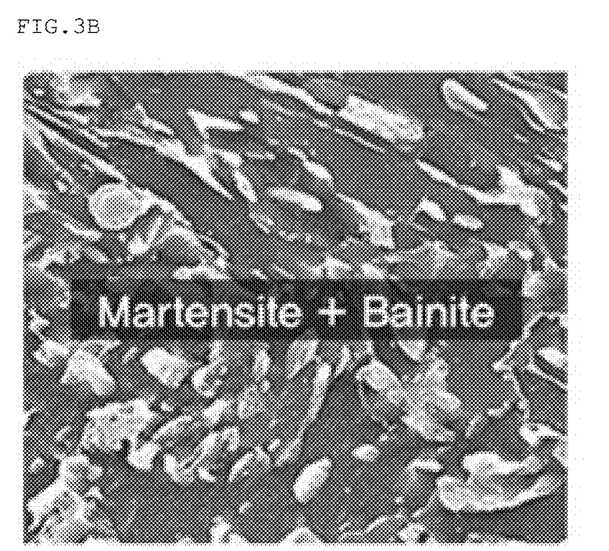

FIGS. 3A and 3B are photographs comparatively showing metal structures of railway wheels.

FIG. 3A is a photograph showing a pearlite metal structure which is the metal structure of an existing railway wheel, and FIG. 3B is a photograph showing that martensite and bainite metal structures are mixed. A difference between both metal structures is mainly based on the form of a compound of iron and carbon (carbide), which is referred to as cementite represented by $Fe_3C$. The carbide has a granular structure in the bainite metal structure mixed with the martensite metal structure as shown in FIG. 3B, but has a plate-shaped bedded structure in the pearlite metal structure of FIG. 3A.

In general, the bainite metal structure is more vulnerable to wear than the pearlite metal structure, but prevents spalling or shelling more effectively than the pearlite metal structure. Therefore, the bainite metal structure is more favorable for the railway wheel than the pearlite metal structure.

Therefore, there is an increasing need for the research on a method which can improve the mechanical properties of railway wheels by changing the steel structure of the railway wheels, and thus enhance the railway wheel recycling effect, in order to minimize damage to railway wheels of a railway car, such as wear, spalling or shelling.

SUMMARY

Various embodiments are directed to a welding base metal for recycling a railway wheel and a method for recycling a railway wheel using the same, which can overlay-weld a railway wheel with a welding base metal suitable for overlay-welding a railway wheel through a heat treatment, form a surface hardened layer, and recycle the railway wheel by changing the metal structure of the railway wheel from a pearlite metal structure to a bainite metal structure, in order to recycle the railway wheel.

Also, various embodiments are directed to an apparatus for recycling a railway wheel, to which a method for recycling a railway wheel is applied, and a railway wheel recycled through the method for recycling a railway wheel.

In an embodiment, there is provided a welding base metal which is used for a process of overlay-welding a worn railway wheel and then forming a surface hardened layer by welding the overlay-welded railway wheel in order to recycle the worn railway wheel. The welding base metal may contain carbon of 0.1 to 0.25 wt %, silicon 1.0 to 2.0 wt %, manganese of 2.2 to 3.3 wt %, nickel 0.45 to 0.65 wt %, chromium 0.85 to 2.45 wt %, molybdenum 0.01 to 0.4 wt %, titanium 0.01 to 0.05 wt %, vanadium 0.03 to 0.1 wt %, niobium 0.01 to 0.1 wt %, inevitable impurities and the remainder of iron.

In another embodiment, a method for recycling a railway wheel may include: a railway wheel overlay-welding step of overlay-welding a worn railway wheel by welding the worn railway wheel with a first welding base metal; and a surface hardened layer forming step of forming a surface hardened layer by welding the overlay-welded railway wheel with a second welding base metal. The first welding base metal may contain carbon of 0.05 to 0.15 wt %, silicon 0.2 to 1.0 wt %, manganese 1.0 to 2.0 wt %, chromium 0.6 to 1.2 wt %, inevitable impurities and the remainder of iron. The second welding base metal may contain carbon of 0.1 to 0.25 wt %, silicon 1.0 to 2.0 wt %, manganese of 2.2 to 3.3 wt %, nickel 0.45 to 0.65 wt %, chromium 0.85 to 2.45 wt %, molybdenum 0.01 to 0.4 wt %, titanium 0.01 to 0.05 wt %, vanadium 0.03 to 0.1 wt %, niobium 0.01 to 0.1 wt %, inevitable impurities and the remainder of iron. The railway wheel may be a railway wheel of any one of a freight car, a passenger car, an urban railway train and a subway train.

In accordance with the embodiments of the present disclosure, the welding base metal for recycling a railway wheel in accordance with the embodiment of the present disclosure may be used as a surface hardened layer of a railway wheel because the welding base metal has high hardness while exhibiting a similar property to the railway wheel. Furthermore, the welding base metal can change the metal structure of the recycled railway wheel from the existing pearlite metal structure to the bainite metal structure, thereby preventing damage to the recycled railway wheel.

Furthermore, the method for recycling a railway wheel in accordance with the embodiment of the present disclosure may overlay-weld the damaged railway wheel to its original size, form the surface hardened layer, and change the metal structure of the railway wheel from the existing pearlite metal structure to the bainite metal structure by changing the composition of the second welding base metal and adjusting the process of the pre-heat treatment and the post heat treatment, thereby minimizing the occurrence of damage to the recycled railway wheel.

DETAILED DESCRIPTION

The present disclosure may be modified in various manners and have various embodiments. Thus, specific embodiments will be illustrated in the accompanying drawings, and described in detail with the reference to the drawings. However, the present disclosure is not limited to the specific embodiments, but may include all modifications, equivalents and substitutions without departing from the sprit and scope of the present disclosure.

All terms used herein, which include technical or scientific terms, may have the same meanings as those generally understood by those skilled in the art to which the present disclosure pertains, as long as the terms are differently defined. The terms defined in a generally used dictionary should be construed to have meanings which coincide with contextual meanings in the related art. As long as the terms are not clearly defined in this specification, the terms should not be construed as ideal or excessively formal meanings.

As described above, the bainite metal structure is more favorable for a railway wheel than the pearlite metal structure. Thus, the present disclosure is characterized in that the composition of a second welding base metal is changed in order to change an existing railway wheel having the pearlite metal structure to a railway wheel having the bainite metal structure, and the processes of pre-heat treatment and post-heat treatment are adjusted.

Hereafter, the present disclosure will be described in detail with reference to the drawings.

Figure 4:
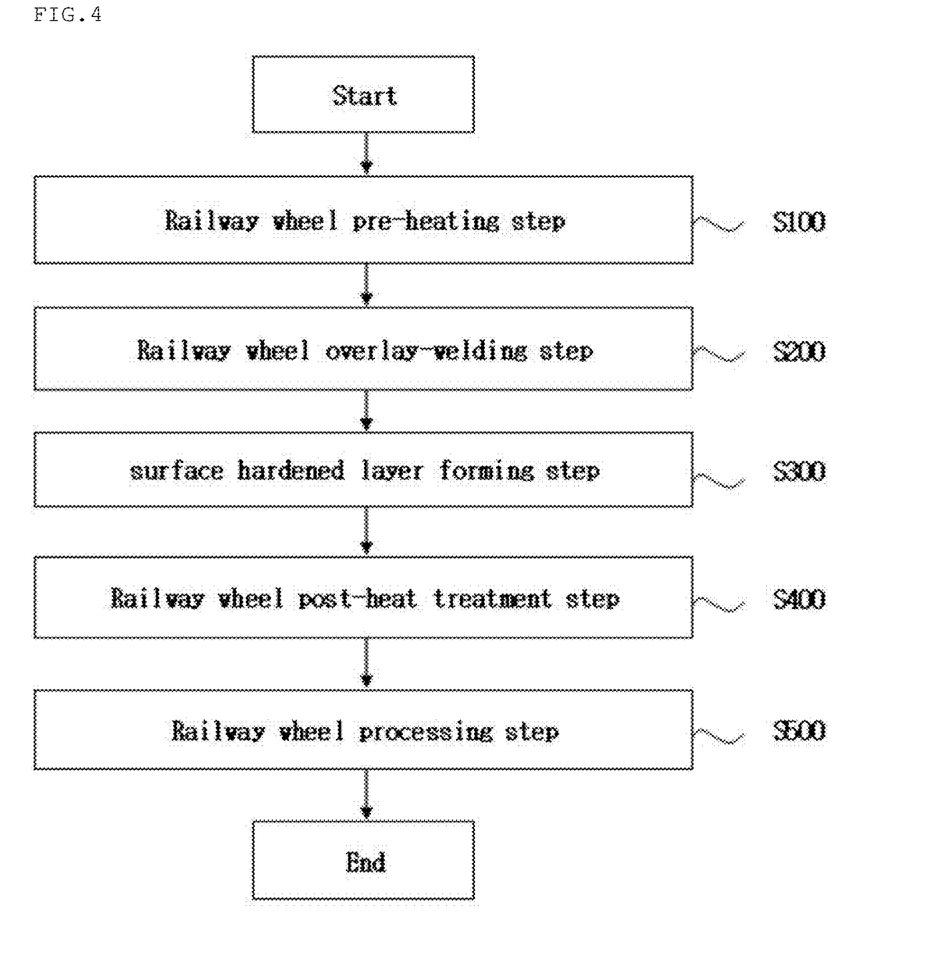
FIG. 4 is a flowchart illustrating a process of a method for recycling a railway wheel in accordance with an embodiment of the present disclosure.

FIG. 4 is a flowchart illustrating a process of a method for recycling a railway wheel in accordance with an embodiment of the present disclosure.

Referring to FIG. 4, the method for recycling a railway wheel in accordance with the embodiment of the present disclosure includes a railway wheel overlay-welding step S200 and a surface hardened layer forming step S300.

Typically, a railway wheel is designed to basically have has a high-carbon, low-manganese and low-chromium composition, in order to raise the stability and hardness of its structure in a cast state. For example, the worn railway wheel may contain carbon of 0.01 to 0.75 wt %, silicon of 0.15 to 1.0 wt %, manganese of 0.5 to 0.9 wt %, inevitable impurities and the remainder of iron. The worn railway wheel may further include chromium of 0.1 to 0.3 wt %.

The railway wheel overlay-welding step S200 is to increase the size of a worn railway wheel to the size of a railway wheel which is not yet worn, by welding the worn railway wheel with the first welding base metal.

Unlike the conventional method for recycling a worn railway wheel through a cutting work, the method for recycling a railway wheel in accordance with the embodiment of the present disclosure can recycle a worn railway wheel by overlay-welding the worn railway wheel to its original size, and continuously raise the worn railway wheel without discarding the worn railway wheel, even though the railway wheel is worn again. Therefore, the period of use of the railway wheel is increased, which makes it possible to reduce various raw materials required for manufacturing a new railway wheel and the amount of carbon dioxide while lowering the manufacturing cost and the maintenance cost. Furthermore, the method can form a surface hardened layer on the overlay-welded railway wheel to delay the initial wear time, which makes it possible to extend the period of use of the railway wheel.

The first welding base metal which is used to overlay-weld the worn railway wheel in the railway wheel overlay-welding step S200 may be designed to have a low-carbon, high-manganese and high-chromium composition, in order to increase the stability and hardness of its structure. At this time, in order for the welded portion to have a composition suitable for performing overlay welding while exhibiting a similar property to the railway wheel, the first welding base metal may contain carbon of 0.05 to 0.15 wt %, silicon of 0.2 to 1.0 wt %, manganese of 1.0 to 2.0 wt %, chromium of 0.6 to 1.2 wt %, inevitable impurities and the remainder of iron.

At this time, it is more preferred that the first welding base metal contains carbon of 0.06 to 0.09 wt %, silicon of 0.4 to 0.8 wt %, manganese of 1.0 to 1.5 wt %, chromium of 0.8 to 1.0 wt %, inevitable impurities and the remainder of iron.

The first welding base metal may contain carbon of 0.05 to 0.15 wt %.

When the first welding base metal contains a smaller amount of carbon than the carbon content of the worn railway wheel, the first welding base metal can block injection of carbon into the worn railway wheel during welding. When the first welding base metal contains carbon of less than 0.05 wt %, the strength may be lowered. When the first welding base metal contains carbon of more than 0.15 wt %, carbon may be injected into the railway wheel during welding, and brittleness may be given to the welded portion.

The first welding base metal may include silicon of 0.2 to 1.0 wt %.

When the first welding base metal contains a smaller amount of silicon than the silicon content of the worn railway wheel, the workability of the welding can be increased, and the shape, size and continuity of beads can be improved. The beads indicate belt-shaped long deposited portions formed as a base material and a welding rod are molten during the welding. When the first welding base metal contains carbon of less than 0.2 wt %, the hardness of the first welding base metal may be reduced. When the first welding base metal contains silicon of more than 1.0 wt %, the workability may be reduced, and the shape, size and continuity of the bead may be degraded.

The first welding base metal may include manganese of 1.0 to 2.0 wt %.

When the first welding base metal contains a larger amount of manganese than the manganese content of the worn railway wheel, the beads may be spread during the welding, such that the welding is densely performed. When the first welding base metal contains manganese of less than 1.0 wt %, the first welding base metal may not serve as a deoxidizer. When the first welding base metal contains manganese of more than 2.0 wt %, the beads may not be spread.

The first welding base metal may include chromium of 0.6 to 1.2 wt %.

When the first welding base metal contains a larger amount of chromium than the chromium content of the worn railway wheel, the strength of the welded railway wheel may be raised. At this time, the high carbon content may raise the strength of the railway wheel. However, since the welding base metal is designed to have a low-carbon composition, a large amount of chromium may be added to raise the strength. When the first welding base metal contains chromium of less than 0.6 wt %, the strength of the welded railway wheel may be lowered. Even when the first welding base metal contains chromium of more than 1.2 wt %, the strength may be lowered.

The first welding base metal may include inevitable impurities, and the evitable impurities may include phosphorous, sulfur and molybdenum.

The surface hardened layer forming step S300 is to form the surface hardened layer by welding the railway wheel overlay-welded in the railway wheel overlay-welding step S200 with a second welding base metal. Specifically, the surface hardened layer forming step S300 includes forming the surface hardened layer having lower hardness than the rail of the railway and higher hardness than the existing recycled railway wheel by hardening the surface of the railway wheel, the size of which has been increased in the railway wheel overlay-welding step S200, with the second welding base metal.

The second welding base metal which is used to form the surface hardened layer by welding the overlay-welded railway wheel in the surface hardened layer forming step S300 has a suitable composition as a welding material which can harden the surface of the railway wheel while exhibiting a similar property to the railway wheel. Therefore, the second welding base metal may be used as a welding material for hardening the surface of the railway wheel.

The second welding base metal contains carbon of 0.1 to 0.25 wt %, silicon of 1.0 to 2.0 wt %, manganese of 2.2 to 3.3 wt %, nickel of 0.45 to 0.65 wt %, chromium of 0.85 to 2.45 wt %, molybdenum of 0.01 to 0.4 wt %, titanium of 0.01 to 0.05 wt %, vanadium of 0.03 to 0.08 wt %, niobium of 0.01 to 1.0 wt %, inevitable impurities and the remainder of iron.

The second welding base metal may contain carbon of 0.1 to 0.25 wt %.

When the second welding base metal contains a larger amount of carbon than the carbon content of the first welding base metal, the second welding base metal may harden the surface of the railway wheel because the second welding base metal has high hardness. When the second welding base metal contains carbon of less than 0.1 wt %, the strength may be lowered. When the second welding base metal contains carbon of more than 0.25 wt %, brittleness may be given to the welded portion.

The second welding base metal may contain silicon of 1.0 to 2.0 wt %.

When the second welding base metal contains a smaller amount of silicon than the silicon content of the worn railway wheel, the workability of the welding may be increased, and the shape, size and continuity of beads may be improved. When the second welding base metal contains silicon of less than 1.0 wt %, the hardness of the second welding base metal may be reduced. When the second welding base metal contains silicon of more than 2.0 wt %, the workability may be reduced, and the shape, size and continuity of beads may be degraded.

The second welding base metal may contain manganese of 2.2 to 3.3 wt %.

When the second welding base metal contains a larger amount of manganese than the manganese content of the worn railway wheel, beads may be spread during the welding, such that the welding is densely performed. When the second welding base metal contains manganese of less than 2.2 wt %, the second welding base metal may not serve as a deoxidizer. When the second welding base metal contains manganese of more than 3.3 wt %, beads may not be spread.

The second welding base metal may contain nickel of 0.45 to 0.65 wt %.

As the second welding base metal contains nickel, the strength and hardness of the welded railway wheel may be improved.

The second welding base metal may contain chromium of 0.85 to 2.45 wt %.

When the second welding base metal contains a larger amount of chromium than the chromium content of the worn railway wheel, the strength of the welded railway wheel may be raised. At this time, high carbon content may increase the strength of the railway wheel. However, since the welding base metal is designed to have a low-carbon composition, a large amount of chromium may be added to increase the strength. When the second welding base metal contains chromium of less than 0.85%, the strength of the welded railway wheel may be lowered. When the chromium content exceeds 2.45 wt %, the cost may be increased due to the high price of chromium.

The second welding base metal may contain molybdenum of 0.01 to 0.4 wt %.

Molybdenum lowers a critical cooling rate for creating the bainite structure, and contributes to precipitation hardening. When the second welding base metal contains molybdenum of less than 0.01 wt %, the wear resistance of the second welding base metal at high temperature may be degraded in the case that the temperature momentarily approaches 3,000° C. during welding. When the second welding base metal contains molybdenum of more than 0.4 wt %, the cost may be increased due to the high price of molybdenum.

The second welding base metal may contain titanium of 0.01 to 0.05 wt %. Titanium (Ti) functions to contribute to precipitation hardening and grain size refinement. When the second welding base metal contains titanium (Ti) of less than 0.01 wt %, the effects of precipitation hardening and grain size refinement are not large. When the second welding base metal contains titanium (Ti) of more than 0.05 wt %, not only the effect of precipitation hardening is not large, but also the cost may be increased due to the high price of titanium (Ti).

The second welding base metal may contain vanadium of 0.03 to 0.10 wt %. Vanadium (V) is a component added to a rolled steel product to contribute to precipitation hardening. When the second welding base metal contains vanadium (V) of less than 0.03 wt %, no strength improvement effect may be achieved. When the second welding base metal contains vanadium (V) of more than 0.10 wt %, not only the effect of precipitation hardening is not large, but also the cost may be increased due to the high price of vanadium (V).

The second welding base metal may contain niobium of 0.01 to 0.10 wt %.

Niobium (Nb) functions to increase strength through grain refinement and raising of a re-crystallization temperature. When the second welding base metal contains niobium (Nb) of less than 0.01 wt %, no strength improvement effect may be achieved. When the second welding base metal contains niobium (Nb) of more than 0.10 wt %, not only the effects of grain refinement and strength improvement are not large, but also the cost may be increased due to the high price of niobium (Nb).

The second welding base metal may contain inevitable impurities, and the evitable impurities may include phosphorous and sulfur.

By changing the composition of the second welding base metal as described above, the steel structure of the railway wheel may be changed from the pearlite structure to the bainite structure, which makes it possible to prevent damage to the railway wheel, such as spalling or shelling.

At this time, the welding in the railway wheel overlay-welding step S200 and the surface hardened layer forming step S300 may be performed by any one method of gas shield welding, open arc welding, submerged arc welding and automatic welding.

The gas shield welding is also referred to as flux cored arc welding and used when the size of a welding rod is 1.2 or 1.6ϕ. The gas shield welding uses shield gas ($CO_2$ gas or $N_2$ gas) serving as an arc shield, and has low heat input.

The open arc welding which is used when the size of a welding rod is 2.4 to 3.2ϕ is the most modern method having the best workability, and may be used during high-capacity welding.

The submerged arc welding which is used when the size of a welding rod is 2.4 to 4.8ϕ has excellent workability. However, since dead time occurs when shield flux is used, the submerged arc welding exhibits lower workability than the open arc welding.

The automatic welding may refer to welding which is automatically performed along the shape of a horizontal surface or circular surface by digitalized values. The automatic welding may operate an algorithm in real time to monitor the deposited state while automatically performing welding. The automatic welding may have a high determination probability and perform total inspection in real time.

At this time, the automatic welding may be performed by a deposition state monitoring system, but the automatic welding equipment is not limited thereto.

Figure 5:
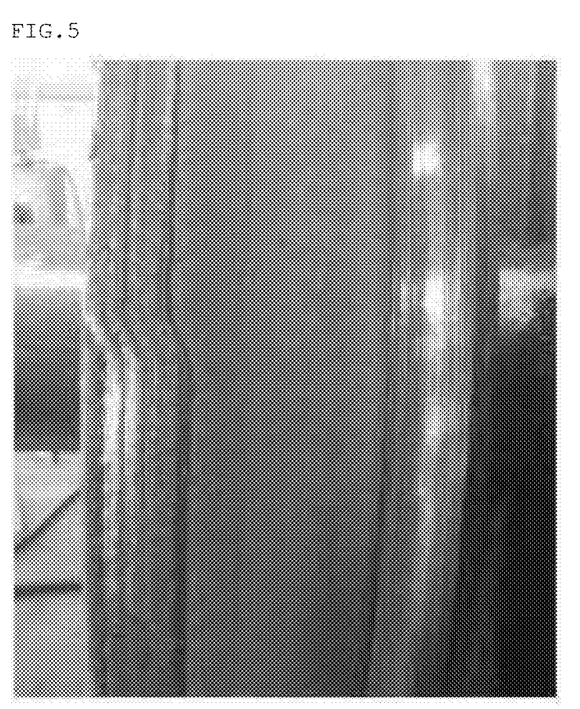
FIG. 5 is a photograph showing that overlay welding is performed on a worn railway wheel through the method for recycling a railway wheel in accordance with the embodiment of the present disclosure.
Figure 6:
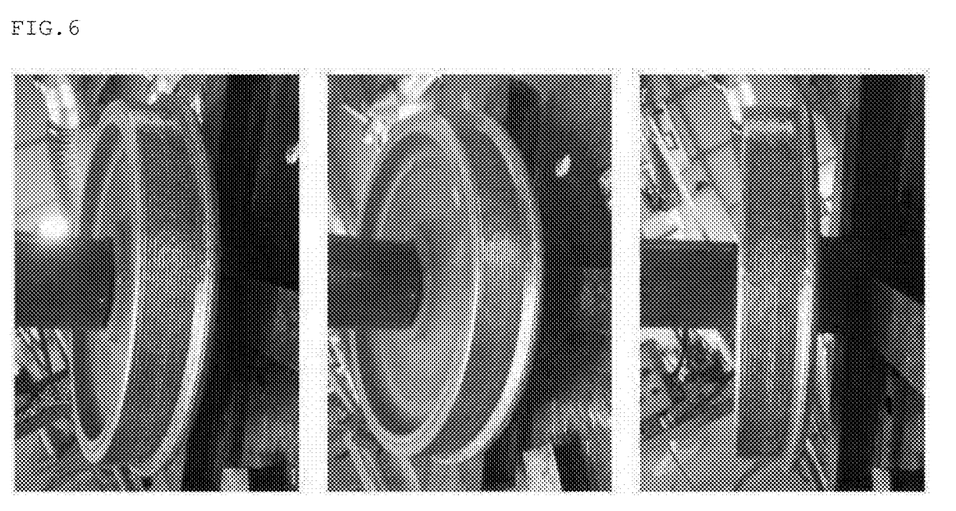
FIG. 6 is a photograph showing the railway wheel on which overlay welding has been performed through the method for recycling a railway wheel in accordance with the embodiment of the present disclosure.

FIG. 5 is a photograph showing that overlay welding is performed on a worn railway wheel through the method for recycling a railway wheel in accordance with the embodiment of the present disclosure, and FIG. 6 is a photograph showing the railway wheel on which overlay welding has been performed through the method for recycling a railway wheel in accordance with the embodiment of the present disclosure.

As illustrated in FIG. 4, the method for recycling a railway wheel in accordance with the embodiment of the present disclosure may further include a railway wheel pre-heating step S100 for pre-heating the worn railway wheel, before performing the railway wheel overlay-welding step S200.

The railway wheel pre-heating step S100 may be performed to facilitate metal fusion bonding, and reduce residual stress after welding.

At this time, the pre-heating may be performed at a temperature of 250 to 300° C.

When the pre-heating of the railway wheel is performed at a temperature of less than 250° C., the effect of facilitating fusion bonding and the effect of reducing residual stress after welding may be reduced, and a defect such as crack may occur after welding. When the pre-heating of the railway wheel is performed at a temperature of more than 300° C., the effect by the pre-heating within the above-described temperature range can be sufficiently obtained. Therefore, the cost for raising the temperature may be increased.

Although not illustrated in FIG. 4, the method for recycling a railway wheel in accordance with the embodiment of the present disclosure may further include a step of checking the crack degree and wear amount of the railway wheel, before performing the railway wheel pre-heating step S100.

When the railway wheel has a crack therein, the railway wheel pre-heating step S100 and the railway wheel overlay-welding step S200 cannot be performed. Therefore, the crack state may be checked, and the wear amount may be checked to measure a overlay-welding amount. Preferably, an ultra sonic auto system may be used to check the crack degree and the wear amount, but the checking equipment is not limited thereto.

Although not illustrated in FIG. 4, the method for recycling a railway wheel in accordance with the embodiment of the present disclosure may further include a step of cutting a tread surface of the railway wheel, before performing the railway wheel pre-heating step S100 and the railway wheel overlay-welding step S200.

The surface of the worn railway wheel may be hardened because the worn railway wheel has come in contact with the rail for a long time. Therefore, this portion may be cut and removed to improve the adhesion between welded portions.

The method for recycling a railway wheel in accordance with the embodiment of the present disclosure may further include a railway wheel post heat treatment step S400 of performing a heat treatment on the railway wheel welded in the surface hardened layer forming step S300, after performing the surface hardened layer forming step S300. The heat treatment may remove residual stress caused during the welding.

When the railway wheel is slowly cooled for a long time after the heat treatment, the railway wheel has the pearlite structure. When the railway wheel is quenched for a very short time after the heat treatment, the railway wheel has the martensite structure. The pearlite structure is vulnerable to spalling, shelling and the like, and the martensite structure is so brittle that spalling occurs. Furthermore, the bainite structure can efficiently prevent spalling and shelling, but has lower wear resistance than the pearlite structure.

Therefore, the method for recycling a railway wheel in accordance with the embodiment of the present disclosure is characterized in that the process of the heat treatment is adjusted to form a metal structure closer to the bainite structure than the pearlite structure or the martensite structure.

In the method for recycling a railway wheel in accordance with the embodiment of the present disclosure, the post-heat treatment may be performed at a temperature of 240° C. to 260° C. for four hours. Then, the railway wheel is slowly cooled from 250° C. to 100° C. at a speed of 40° C. per hour for four hours. Then, the railway wheel is slowly cooled under the atmospheric condition while the temperature is maintained at 100° C. or less.

That is, in the post heat treatment step in accordance with the embodiment of the present disclosure, the railway wheel may be slowly cooled at constant temperature after the heat treatment, and thus have a metal structure closer to the bainite structure than the pearlite structure.

When the post heat treatment is performed at a temperature of less than 240° C., the residual stress removal effect may be reduced. When the post heat treatment is performed at a temperature of more than 260° C., the strength of the recycled railway wheel may be lowered. Furthermore, when the post heat treatment is performed for less than four hours, the residual stress removal effect may be reduced. When the post heat treatment is performed for more than four hours, the strength of the recycled railway wheel may be lowered.

The method for recycling a railway wheel in accordance with the embodiment of the present disclosure may further include a railway wheel processing step S500 of cutting or grinding the railway wheel heat-treated in the railway wheel post heat treatment step S400, after the railway wheel post heat treatment step S400 is performed. Through the railway wheel processing step S500, the dimension, roughness and roundness of the recycled railway wheel may be satisfied. At this time, the grinding process may be performed by a CNC turning machine. However, the grinding equipment is not limited thereto.

Hereafter, the present disclosure will be described in more detail with reference to Examples. However, the following Examples are only examples for describing the present disclosure, and the scope of the present disclosure is not limited to the following Examples.

EXAMPLE 1

Step 1: A worn railway wheel was vertically mounted on a welding torch, the worn railway wheel having a diameter of 820 mm, including a flange with a width of 23 mm, and having a composition of carbon 0.66 wt %, silicon 0.22 wt %, manganese 0.72 wt %, inevitable impurities and the remainder of iron. The presence of crack in the worn railway wheel and the wear amount of the worn railway wheel were checked to decide whether to perform welding and how much welding is required.

A hardened surface portion of the worn railway wheel was removed through cutting, and the worn railway wheel was separated from a shaft and independently mounted in a positioner. Then, the railway wheel was pre-heated at a temperature of 250° C. to 300° C. such that welding is easily performed. (Railway wheel pre-heating step S100).

While the worn railway wheel was rotated at a linear velocity of at least 600 mm per minute by a control system, overlay welding was performed on the base material of the worn railway wheel at the outer peripheral thereof with a first welding base metal, such that a welding thickness ranges from 15 to 20 mm, the first welding base metal having a composition of carbon 0.09 wt %, silicon 0.51 wt %, manganese 1.32 wt %, chromium 0.92 wt %, inevitable impurities and the remainder of iron. (Railway wheel overlay-welding step S200).

The welding was performed under the following conditions: a voltage ranges from 26 to 35V, a current ranges from 350 to 450 A, and a distance between a wire tip and the surface of the base material at the outer periphery ranges from 25 to 35 mm.

Step 2: Welding for forming a surface hardened layer was performed on the railway wheel subjected to the overlay welding of step S1 with a second welding base metal under the same conditions as the welding conditions of step S1, such that a welding thickness ranges from 9 to 10 mm, the second welding base metal having a composition of carbon 0.18 wt %, silicon 1.22 wt %, manganese 2.55 wt %, nickel 0.52 wt %, chromium 1.8 wt %, molybdenum 0.09 wt %, titanium 0.02 wt %, vanadium 0.03 wt %, niobium 0.02 wt %, inevitable impurities and the remainder of iron. (Surface hardened layer forming step S300).

The recycled railway wheel was post heat-treated at 250° C. for four hours, and slowly cooled at a speed of 40° C. per hour for four hours until the temperature becomes 100° C. Then, the railway wheel was slowly cooled under the atmospheric condition while the temperature was maintained at 100° C. or less, in order to remove stress after the welding. (Railway wheel post heat treatment step S400).

The post heat-treated railway wheel was processed through the CNC turning machine to satisfy the dimension, roughness and roundness, in order to recycle the railway wheel. (Railway wheel processing step S500).

EXAMPLE 2

Step 1: The worn railway wheel having a composition of carbon 0.7 wt %, silicon 0.25 wt %, manganese 0.7 wt %, chromium 0.17 wt %, inevitable impurities and the remainder of iron and the first welding base metal having a composition of carbon 0.77 wt %, silicon 0.5 wt %, manganese 1.1 wt %, chromium 0.9 wt %, inevitable impurities and the remainder of iron were applied to perform an experiment, while the other conditions were the same as Example 1.

Step 2: The second welding base metal having a composition of carbon 0.19 wt %, silicon 1.42 wt %, manganese 2.8 wt %, nickel 0.55 wt %, chromium 2.0 wt %, molybdenum 0.16 wt %, titanium 0.03 wt %, vanadium 0.05 wt %, niobium 0.02 wt %, inevitable impurities and the remainder of iron was applied to perform welding for recycling the railway wheel, while the other conditions were the same as Example 1.

EMBODIMENT 3

Step 1: The worn railway wheel having a composition of carbon 0.06 wt %, silicon 0.4 wt %, manganese 1.0 wt %, chromium 0.8 wt %, inevitable impurities and the remainder of iron was applied to perform an experiment, while the other conditions were the same as Example 1.

Step 2: The second welding base metal having a composition of carbon 0.2 wt %, silicon 1.6 wt %, manganese 3.0 wt %, nickel 0.58 wt %, chromium 2.0 wt %, molybdenum 0.2 wt %, titanium 0.04 wt %, vanadium 0.06 wt %, niobium 0.04 wt %, inevitable impurities and the remainder of iron was applied to perform welding for recycling the railway wheel, while the other conditions were the same as Example 1.

EXAMPLE 4

Step 1: The first welding base metal having a composition of carbon 0.09 wt %, silicon 0.8 wt %, manganese 1.5 wt %, chromium 1.0 wt %, inevitable impurities and the remainder of iron was applied to perform an experiment, while the other conditions were the same as Example 1.

Step 2: The second welding base metal having a composition of carbon 0.22 wt %, silicon 1.7 wt %, manganese 3.2 wt %, nickel 0.6 wt %, chromium 2.4 wt %, molybdenum 0.3 wt %, titanium 0.05 wt %, vanadium 0.07 wt %, niobium 0.05 wt %, inevitable impurities and the remainder of iron was applied to perform welding for recycling the railway wheel, while the other conditions were the same as Example 1.

EXPERIMENTAL EXAMPLE 1

Figure 7:
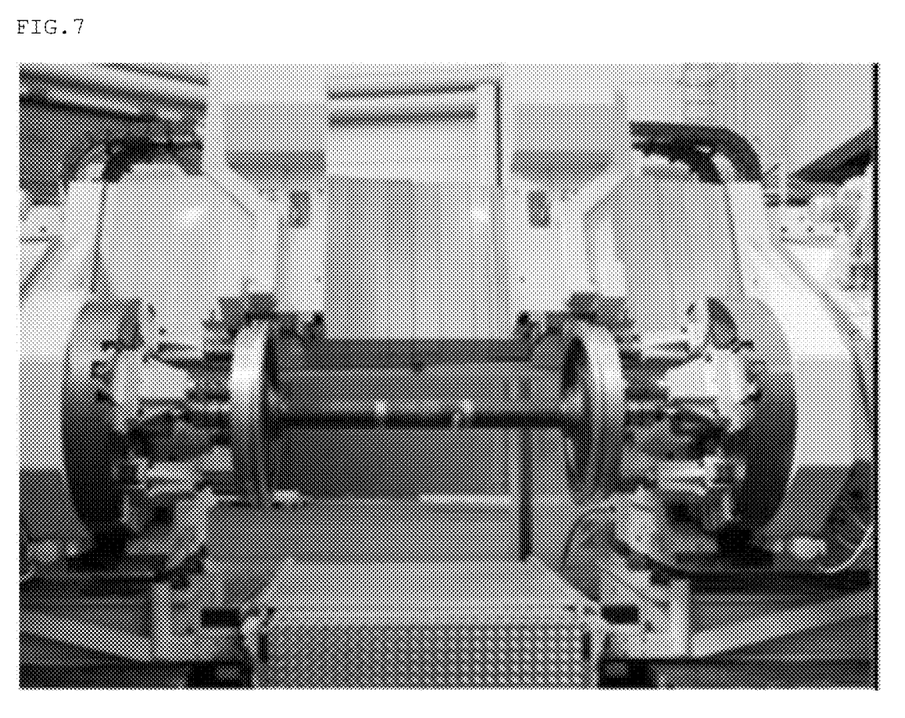
FIG. 7 is a photograph showing that a railway wheel is processed by a CNC turning machine in the method for recycling a railway wheel in accordance with an embodiment of the present disclosure.

The recycling process of the worn railway wheel manufactured in Example 1 was observed, and the observation results were shown in FIGS. 5 to 7.

As illustrated in FIG. 1, the worn railway wheel has a considerable wear amount due to a long-time contact with the rail.

As shown in FIG. 5, beads were welded at a proper welding voltage while welding is performed on a surface formed by cutting the hardened surface.

As shown in FIG. 6, the beads were formed in proper shapes and sizes after the welding of step 1 was performed, and the continuity of the beads was maintained, which indicates that the welding was uniformly performed.

As shown in FIG. 7, the surface of the railway wheel was processed by the CNC turning machine after the heat treatment of step 2, in order to satisfy the dimension, luminance and roundness.

In this way, the railway wheel can be recycled according to the recycling method in accordance with the embodiment of the present disclosure.

The above-described welding base metal for recycling a railway wheel in accordance with the embodiment of the present disclosure may be used as a surface hardened layer of a railway wheel because the welding base metal has high hardness while exhibiting a similar property to the railway wheel. Furthermore, the welding base metal can change the metal structure of the recycled railway wheel, and thus delay the initial wear time of the recycled railway wheel. Furthermore, the method for recycling a railway wheel in accordance with the embodiment of the present disclosure may overlay-weld the damaged railway wheel to its original size, form a surface hardened layer, and change the metal structure of the railway wheel by changing the composition of the welding base metal and performing the pre-heat treatment and the post heat treatment, thereby minimizing the occurrence of damage to the recycled railway wheel.

While various embodiments have been described above, it will be understood to those skilled in the art that the embodiments described are by way of example only. Accordingly, the disclosure described herein should not be limited based on the described embodiments.

What is claimed is:

1. A method for recycling a railway wheel, comprising:
   a railway wheel overlay-welding step of overlay-welding a worn railway wheel by welding the worn railway wheel with a first welding base metal;
   a surface hardened layer forming step of forming a surface hardened layer by welding the overlay-welded railway wheel with a second welding base metal; and
   a railway wheel post heat treatment step of post heat-treating the welded railway wheel, after the surface hardened layer forming step, wherein the railway wheel post heat treatment step is performed in a temperature range of 240° C. to 260° C. for four hours, after the railway wheel post heat treatment step is performed in a temperature range of 240° C. to 260° C. for four hours;

cooling the railway wheel at a temperature of 260° C. at a speed of 40° C. per hour for four hours until the temperature of the railway wheel becomes 100° C.; and cooling the railway wheel under the atmospheric condition while the temperature is maintained at 100° C. or less;

wherein the first welding base metal contains carbon of 0.05 to 0.15 wt %, silicon 0.2 to 1.0 wt %, manganese 1.0 to 2.0 wt %, chromium 0.6 to 1.2 wt %, inevitable impurities and the remainder of iron, wherein the second welding base metal contains carbon of 0.1 to 0.25 wt %, silicon 1.0 to 2.0 wt %, manganese of 2.2 to 3.3 wt %, nickel 0.45 to 0.65 wt %, chromium 0.85 to 2.45 wt %, molybdenum 0.01 to 0.4 wt %, titanium 0.01 to 0.05 wt %, vanadium 0.03 to 0.1 wt %, niobium 0.01 to 0.1 wt %, inevitable impurities and the remainder of iron, wherein the railway wheel is a railway wheel of any one of a freight car, a passenger car, an urban railway train and a subway train.

2. The method of claim 1, wherein the welding in the railway wheel overlay-welding step and the surface hardened layer forming step is performed by any one of gas shield welding, open arc welding, submerged arc welding and automatic welding.

3. The method of claim 1, further comprising a railway wheel pre-heating step of pre-heating the worn railway wheel, before the railway wheel overlay-welding step.

4. The method of claim 3, wherein the railway wheel pre-heating step is performed in a temperature range of 250° C. to 300° C.

5. The method of claim 1, further comprising a railway wheel processing step of cutting or grinding the heat-treated railway wheel, after the railway wheel post heat treatment step.

6. The method of claim 5, wherein the cutting or grinding process is performed by a CNC turning machine.

* * * * *